(12) United States Patent
Barnes et al.

(10) Patent No.: US 6,655,071 B2
(45) Date of Patent: Dec. 2, 2003

(54) WATERFOWL DECOY MOUNTING DEVICE

(76) Inventors: Charles David Barnes, 1405 Woodland Rd., Salisbury, MD (US) 21801; Ellen Marie McLean, 1405 Woodland Rd., Salisbury, MD (US) 21801; John R. Howard, 28 W. 102 Robin La., Northwoods, IL (US) 60185; Charles E. Nichols, 13415 Jones Ct., Plainfield, IL (US) 60544; William Sigsworth, 6339 Surrey Ridge, Lisle, IL (US) 60532

( * ) Notice: Subject to any disclaimer, the term of this patent is extended or adjusted under 35 U.S.C. 154(b) by 0 days.

(21) Appl. No.: 10/252,348

(22) Filed: Sep. 23, 2002

(65) Prior Publication Data

US 2003/0183734 A1 Oct. 2, 2003

Related U.S. Application Data

(63) Continuation-in-part of application No. 10/113,284, filed on Apr. 1, 2002.

(51) Int. Cl.[7] .............................................. A01M 31/06
(52) U.S. Cl. .................. 43/3; 43/2; 248/150; 248/166; 248/436
(58) Field of Search ................................ 246/150, 166, 246/436; 43/2, 3; 403/329, 326, 165, 263, 91; 411/513, 514, 508, 509, 510, 338, 339; 211/195, 203

(56) References Cited

U.S. PATENT DOCUMENTS

| | | | | |
|---|---|---|---|---|
| 694,732 A | | 3/1902 | Coudon | |
| 710,433 A | | 10/1902 | Coudon | |
| 1,376,282 A | * | 4/1921 | Kauffman | 43/3 |
| 1,746,640 A | * | 2/1930 | Emoff | 43/3 |
| 2,246,574 A | | 6/1941 | Coe | |
| 2,547,286 A | * | 4/1951 | Sabin | 43/3 |
| 2,616,200 A | | 11/1952 | Milam | |
| 2,624,144 A | | 1/1953 | Beverman | |
| 2,952,090 A | | 9/1960 | Pittenger | |
| 4,120,110 A | | 10/1978 | Aeschliman | |
| 4,660,313 A | * | 4/1987 | Bauernfeind et al. | 43/3 |
| 4,880,331 A | * | 11/1989 | Zun | 403/24 |
| 4,956,900 A | * | 9/1990 | Mair | 24/606 |
| 5,074,071 A | * | 12/1991 | Dunne | 43/3 |
| 5,293,709 A | | 3/1994 | Cripe | |
| 5,620,272 A | * | 4/1997 | Sheng | 403/96 |
| 5,941,141 A | * | 8/1999 | Whitley | 81/63.1 |

OTHER PUBLICATIONS

US 2002/0064435A1, Sbongk, May 2002, Means for Fastening a Panel–Shaped Structureal Member in an Accommodation Member.*

* cited by examiner

Primary Examiner—Ramon O. Ramirez
Assistant Examiner—Amy J. Sterling

(57) ABSTRACT

A retainer for holding a plurality of waterfowl decoys has at least three arms pivotally mounted on a pin so as to be moveable between a first position in which the arms are aligned parallel to each other for storage and a open position in which the arms are angularly oriented with respect to one another. The device includes a locking pin for fitting into a first set of holes in the three arms for locking the arms in the first position and fitting into a second set of holes in the arms for locking the arms in the second position. The device further includes a moveable post at the end of each arm for retaining a waterfowl decoy and a ratchet engagement between the post and the arm to permit manual movement of the post with respect to the arm to its desired orientation to retain the post in the desired orientation after it has been positioned without requiring the tightening or untightening of screws and the like.

20 Claims, 11 Drawing Sheets

WATERFOWL DECOY MOUNTING DEVICE

This is a continuation in part to our co-pending application filed Apr. 1, 2002 and assigned Ser. No. 10/113,284. The present invention relates to a device for mounting a plurality of waterfowl decoys for use by hunters to attract waterfowl towards a hunter's blind.

BACKGROUND OF THE INVENTION

Hunters of waterfowl conceal themselves in a habitat suitable for hunting waterfowl and employ decoys, which have the appearance of the fowl being hunted, to attract their prey to the site. The decoys have the appearance of waterfowl standing or sitting on the ground or swimming in the water, thereby suggesting to waterfowl flying overhead that the environment is safe.

The decoys used by hunters may be either three dimensional or two dimensional. The two dimensional decoys consist of a planar material such as a plastic or fiberboard sheet cut into the profile of a duck or a goose with the sides thereof depicting a photographic or painted rendition of the bird thereon. Two dimensional decoys lay flat for easy stacking so as to consume a fraction of the space of three dimensional decoys, and waterfowl are surprisingly unsuspicious of such two dimensional decoys. The disadvantage of two dimensional decoys is that they require a mechanical support to hold the planar material on which they are depicted in an erect orientation.

The manufacturers of planar decoys provide stakes having a lower end that is sharpened, suitable for pushing into the ground and an upper end adapted for retaining the planar profile of the waterfowl decoy. Such stakes are satisfactory for use in retaining decoys in a field or the like, where the ground is firm enough to retain the stake and soft for the stake to be manually inserted. Stakes are generally unsuited, however, for use in marshy soil or for retaining a planar decoy vertically on the surface of a pond. Where stakes cannot be used to support decoys, hunters have used boards that have been cut, nailed or screwed into the configuration of a cross or a triangle to serve as a base to which vertical posts are attached for supporting planar decoys.

One of the more sophisticated devices hand made by hunters for retaining planar decoys consists of three elongate sticks pivotally mounted between a pair Of mounting boards with each of the stick pivoting on a pivot pin through one end of the sticks. When not in use, the sticks are pivoted around the pivot pins until they are parallel to each other for convenient storage. When in use, the three sticks are angularly spaced with respect to one another, preferably at 120 degrees from each other, to provide a stable support for three decoys. The wood devices were floated on the surface of a pond to display decoy on the surface of the water.

The devices made by hunters have several shortcomings. First, the three elongate arms of such devices cannot be locked into a desired configuration. For example, where the device is floated on the surface of a pond, the three arms must be maintained in a spaced orientation with respect to one another to maintain stability. In the water. If the movement of the air against the surfaces of the decoys, or the movement of the water, causes one arm to rotate until it is parallel to another, the device can roll on its side, thereby rendering it ineffective. Since the three arms are retained together at only one end, storing is also a problem. Unless a strap or rubberband is employed to retain the second ends together, the arms may open at any inopportune occasions. Also, the posts, which retain the:decoys to the free end of the arms, may be either fixedly secured to their respective arm using nails, screws, or the like, or they may be pivotally attached to the post. Where a single screw attaches the post to the arm, and the screw is not tightened the post could rotate too freely with respect to the arm, the decoy may fall into an inappropriate orientation for water fowl such that its presents no longer suggests a safe region to land. The pivotal post at the free end of the arm complicated storage problems because one or more of the pivotable posts may rotate out of parallel alignment while the device is being stored.

There are no known commercial manufactures of the devices and there is therefor a need for an improved device for mounting two dimensional waterfowl decoys.

SUMMARY OF THE INVENTION

Briefly, the present invention is embodied in a retainer for holding a plurality of waterfowl decoys. The device has at least three arms with each of the arms having a pivot end and a support end with each arm extending generally linearly from the pivot end to the support end to define a length. The device has a pivot for joining the pivot ends of the three arms for rotation about an axis such that the arms are moveable from a first orientation in which the lengths of the arms are parallel to each other for storage, to a second orientation in which the lengths of the arms are angularly spaced from one another.

One aspect of the invention is a locking means for selectively locking and unlocking the arms in either the first orientation or the second orientation, that is either with the arms locked parallel to each other, for storage, or the arms locked spaced from each other for providing a stable mounting surface for retaining planar waterfowl decoys. In accordance with this aspect of the invention, the locking means includes first and second sets of holes extending through the three arms. The arms are configured such that when the first set of holes are aligned a licking pin may be inserted through the aligned holes to retain the arms in a parallel orientation for storage. The arms are also configured such that when the second set of holes are aligned and the locking pin inserted into the second set of aligned holes the three arms will retained in a spaced orientation for stability.

Attached to the support ends of each of three arms is an elongate post having first and second ends, the first ends of which are pivotally attached to the arm and the second ends of which are adapted for retaining planar decoys thereto The pivotal mounting of the post to the arm includes a ratchet which provides resistance to the rotation of the post with respect to the arm to prevent the free end of the post from moving with respect to the arm at inopportune occasions, yet allows a hunter to manipulate the posts with respect to the arm without requiring the tightening and untightening of screws and the like.

BRIEF DESCRIPTION OF THE DRAWINGS

A better understanding of the present invention will be had after a reading of the following detailed description taken in conjunction with the drawings wherein:

FIG. 8A is a cross sectional view of the post shown in FIG. 8 taken through line 8A—8A thereof;

FIG. 8B is a fragmentary enlarged front elevational view of the post shown in FIG. 8;

DETAILED DESCRIPTION OF THE PREFERRED EMBODIMENT

Figure 1:
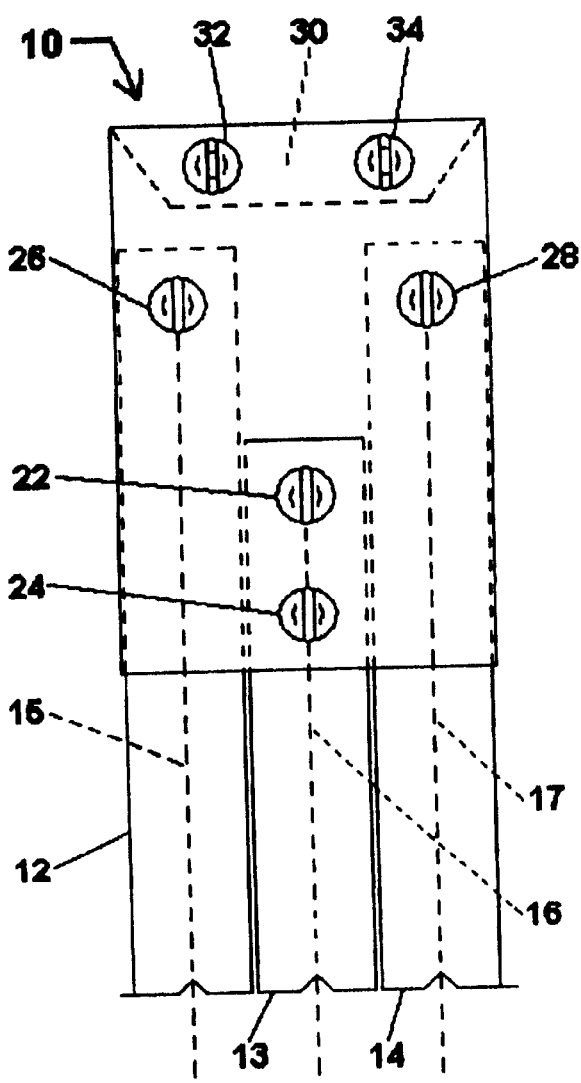
FIG. 1 is a fragmentary front elevational view of a homemade retainer for planar decoys with the interior thereof shown in broken lines.
Figure 2:
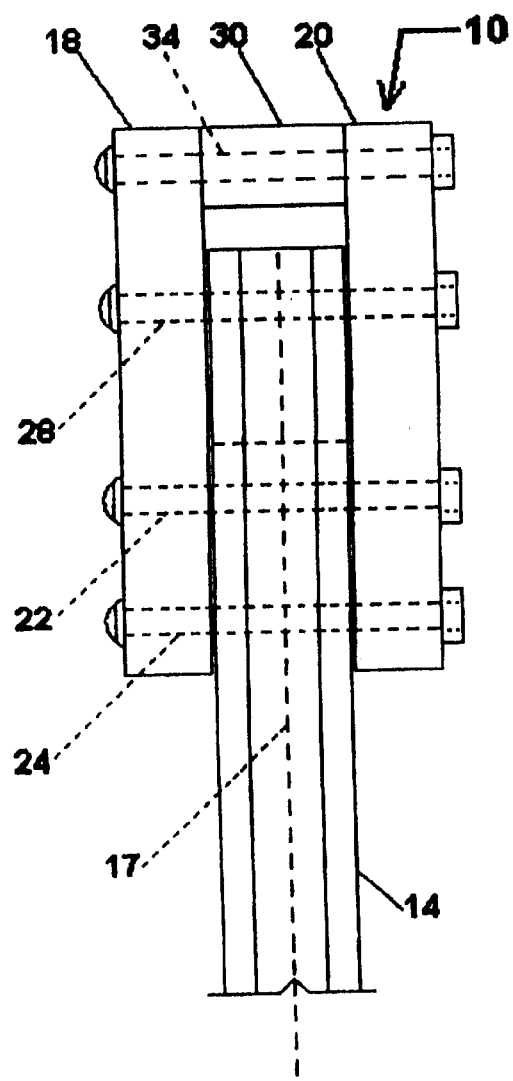
FIG. 2 is a fragmentary side elevational view of the retainer shown in FIG. 1.

Referring to FIGS. 1 and 2, a retainer for waterfowl decoys 10 of the type built by hunters consists of three elongate wood arms 12, 13, 14 usually made by longitudinally ripping a two-by-four into three sticks having generally equally sized cross sections. Each of the arms has a longitudinal axis 15, 16, 17, respectively, a pivot end and an outer-end to which a decoy is attached. The pivot ends of the arms 12, 13, 14 are sandwiched between and upper plate 18 and a lower plate 20 with the center arm held rigid with respect to the plates 18, 20 by a plurality of bolt and nut combinations 22, 24. The pivot ends of the outer arms 12, 14.are positioned on opposite sides of the center arm 13 and are pivotally retained with respect to the plates 18, 20 by associated bolt and nut combinations 26, 28. An elongate end member 30 is also sandwiched between the plates 16, 18 forming a "T" configuration with respect the center arm 13 and is held in place by a pair of bolt and nut combinations 32, 34 to prevent the outer arms 12, 16 from pivoting through an angle greater than about 120 degrees.

The outer arms 12, 13 can be rotated from a closed orientation, as depicted, for storage of the device, to an open position in which the arms 12, 13, 14 are oriented at angles of about 120 degrees to one another, for displaying decoys. One advantage of the above design is that the longitudinal axes 15, 16, 17 of the three arms 12, 13, 14 all move within the same plane regardless of the orientation into which they are pivoted. Accordingly, when the wooden device is floated on the surface of a lake it will remain stable, and not roll over in the water, as might occur if a single bolt were extended through the holes at the pivot ends of the three arms to maintain them in pivotal relationship to each other.

Figure 3:
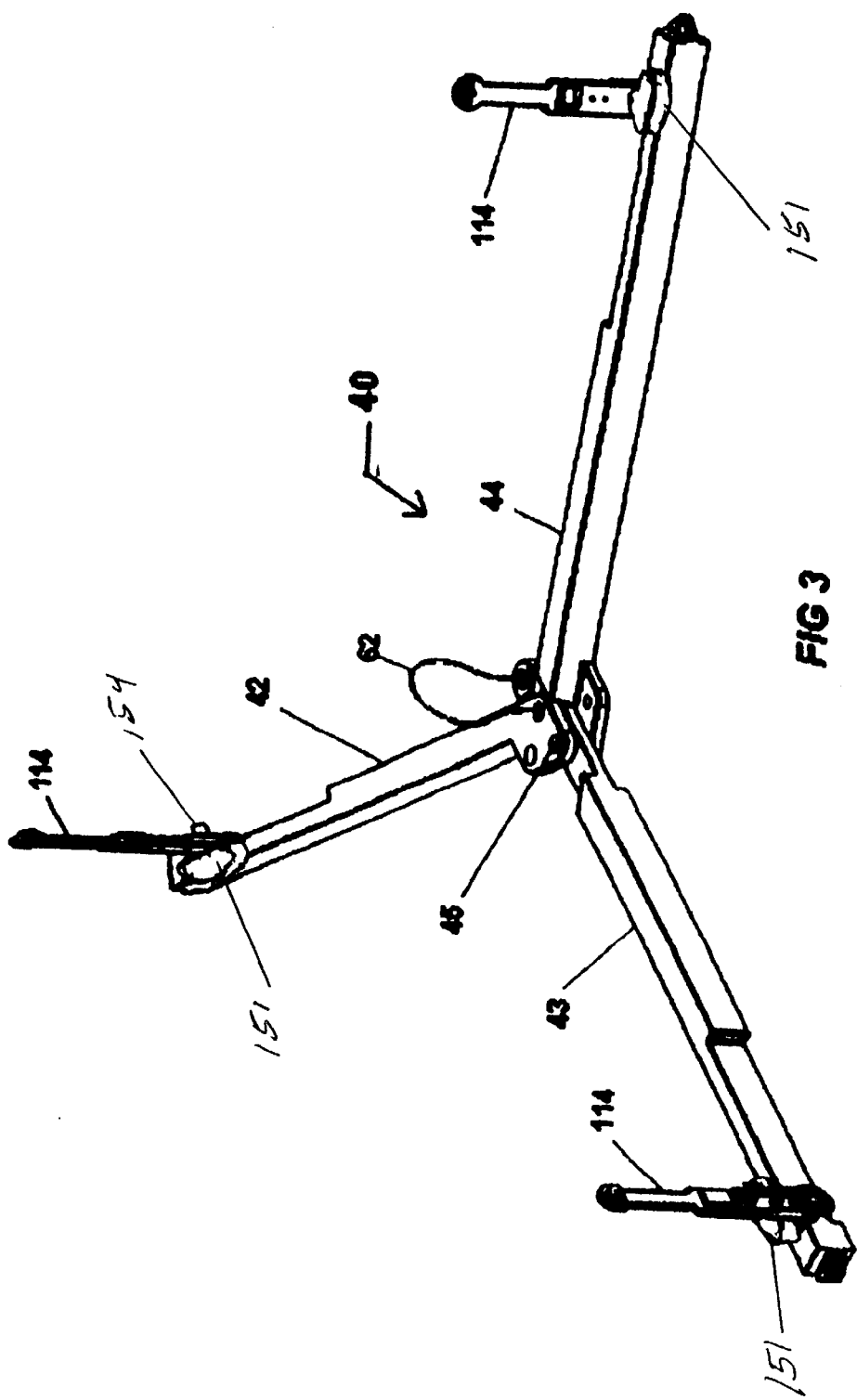
FIG. 3 is an isometric view of a retainer for holding a plurality of planar waterfowl decoys in accordance with the present invention with the arms of the retainer locked with a pin in a spaced relationship to each other and with the mounting post oriented perpendicular to the arms for retaining waterfowl decoys thereto.
Figure 4:
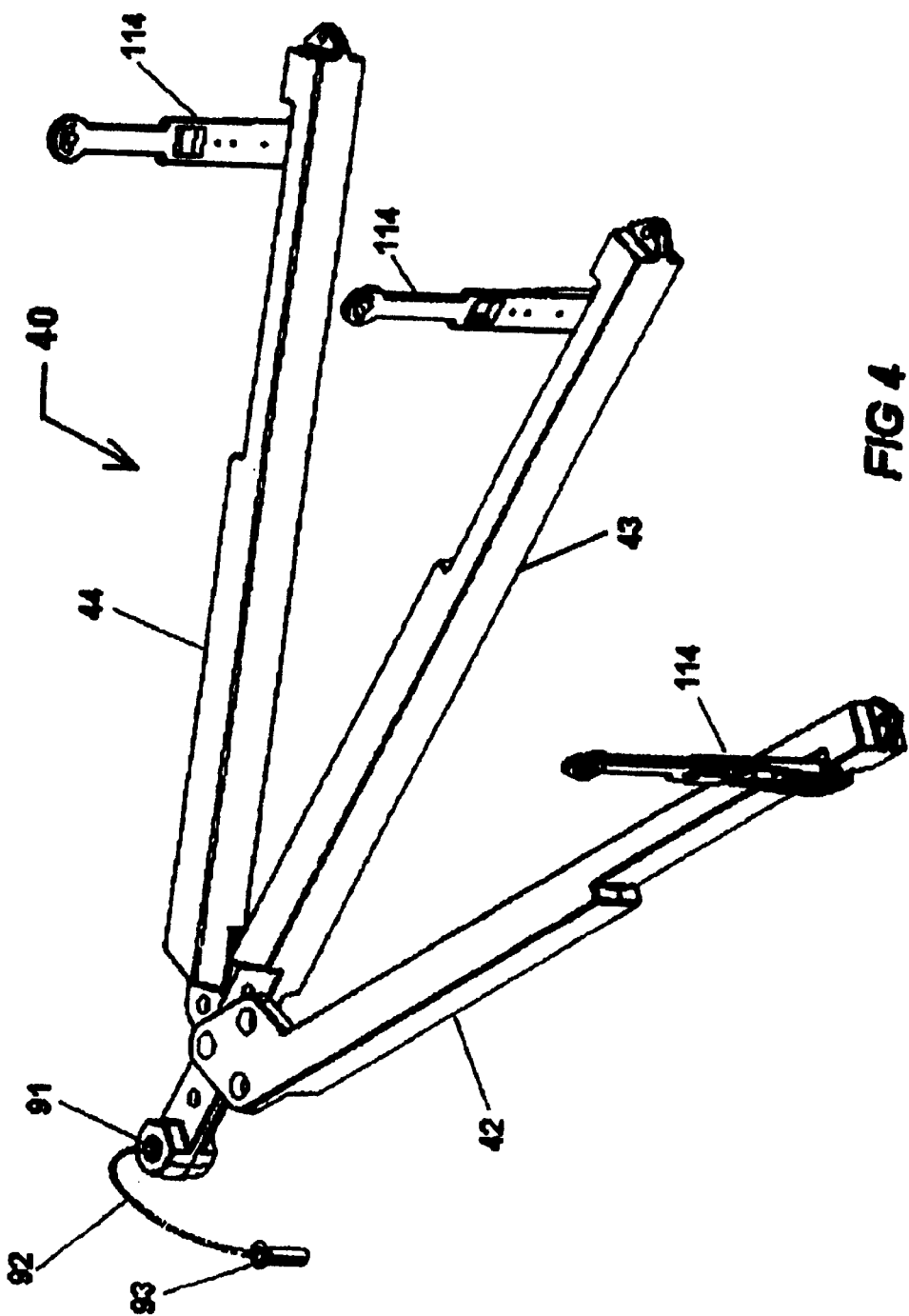
FIG. 4 is another isometric view of the retainer shown in FIG. 3 with the arms partially closed with respect to one another and the posts for retaining a planar decoy still perpendicular to the arms.
Figure 5:
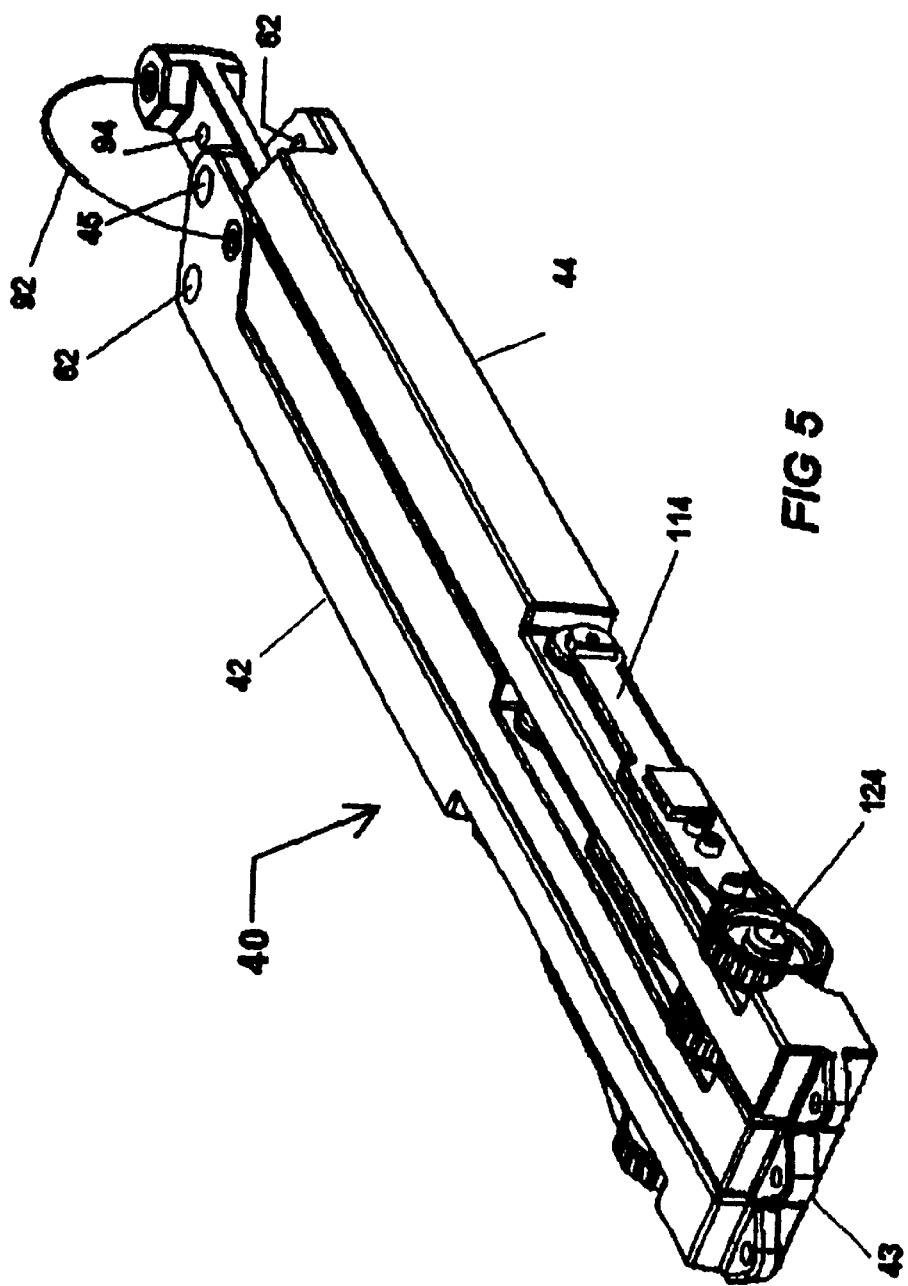
FIG. 5 is an isometric view of the retainer shown in FIG. 3 with the arms thereof oriented parallel to one another, the three arms including two outer arms and a center arm, and the locking pin retaining the arms in the parallel relationship and the post oriented parallel to the arms for storage.

Referring to FIGS. 3, 4 and 5, a retainer 40 for waterfowl decoys in accordance with the present invention has three arms 42, 43, 44 pivotally, mounted about a pivot pin 45 so as to be moveable from a closed, or storage orientation, as depicted in FIG. 5 to a opened, or display orientation, as depicted in FIG. 3.

Figure 6:
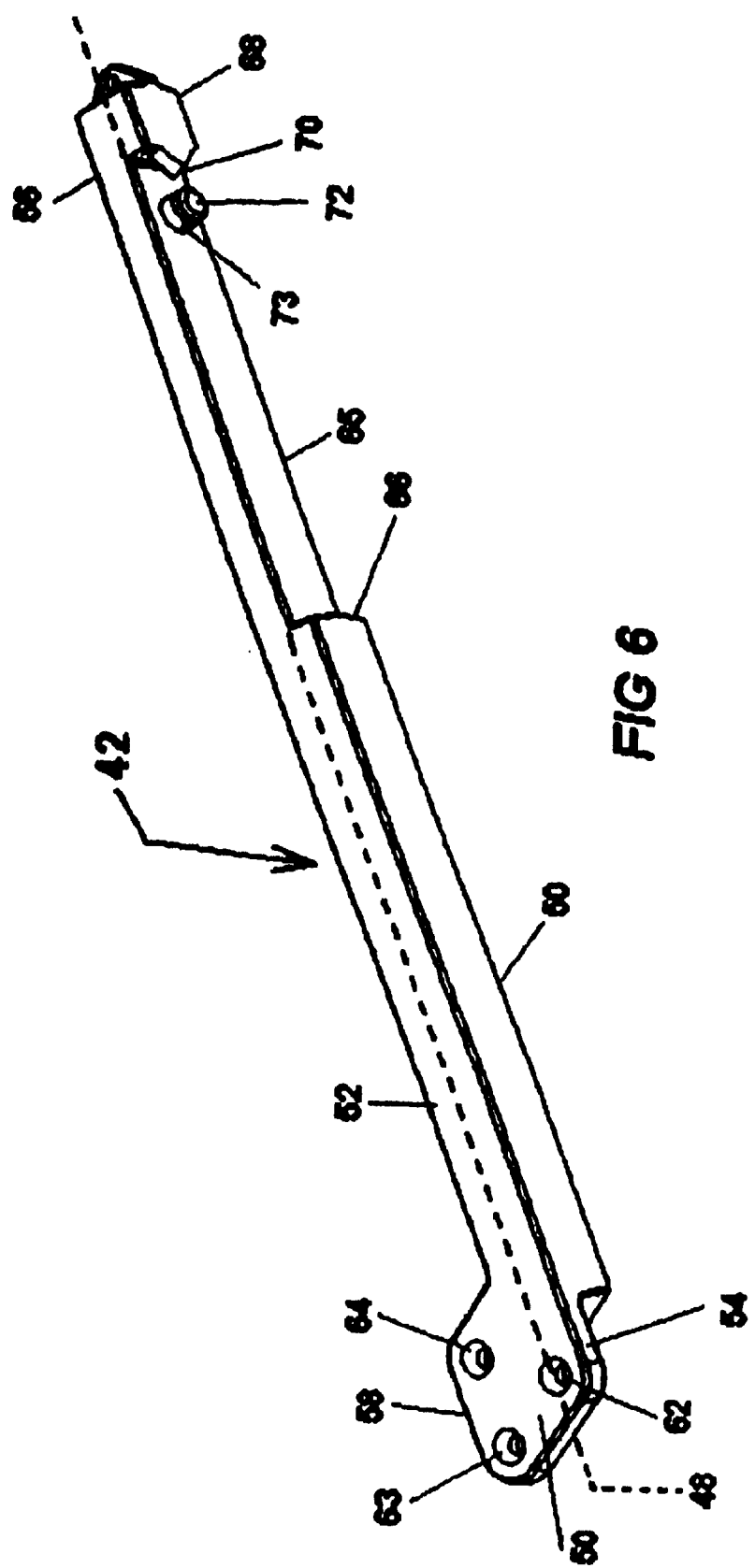
FIG. 6 is an isometric view of one of the two identical outer arms of the retainer depicted in FIG. 3.

Referring to FIG. 6, two of the arms, 42, 44, the outer two as seen in FIG. 5, are identical to each other and, therefore, a description of one of the arms 42 is sufficient to cover both. Each of the outer arms 42 has an elongated body defining an axis 48 with a rectangular cross section having an outer and an inner surface of which only the outer surface 50 is visible. The outer surface 50 and the inner surface, not visible, are separated by side surfaces, one of which 52 is visible. Each outer arm 42 further has a pivot end 54 and a distal end 56. A mounting pad 58 having large planar surfaces parallel to the side surfaces 52 is positioned at the pivot end 54. The pad 58 has a thickness which is approximately one third the thickness of the end arm 42 (the width of the inner and outer surfaces 50) and is offset so as to have one large surface 60 thereof coplanar with side surface 52 as shown. The pad 58 has three parallel transverse holes 62, 63, 64 therein, with one hole 62 positioned generally along the axis 48, the second and third holes 63, 64 offset a short distance with respect to the axis 48 and oriented such that a plane passing the axis of a holes 63, 64 will be parallel to the axis 48 of the arm 42.

Beginning midway along the length of the outer surface 50 of arm 42 and extending a short distance from the distal thereof is an elongate notch 65 forming shoulder 66 near the midpoint along the length thereof, and a projection 68 near the distal end thereof. Extending from the projection 68-towards the shoulder 66 is a pointed tooth 70. Positioned within the notch 65 and spaced a short distance from the tooth 70 is a cylindrical stem 72 extending perpendicular to the axis 48 and perpendicular to the axes of the various holes 62, 63, 64. The stem 72 has an annular groove 73 around the circumference thereof, the groove 73 positioned midway along the length of the stem 72.

Referring to FIGS. 3 to 5 and 7, the center arm 43 has a generally rectangular cross section with opposing inner surfaces, one of which 74 is visible, and opposing upper and lower surfaces, of which only upper surface 76 is visible. The center arm 43 also has a pivot end 78 and a distal end 80 and an axis 82. At the pivot end 78 of the arm 43 is a reduced thickness portion 84 having upper and lower surfaces (only upper surface 86 of which is visible) parallel to the upper and lower surfaces 76 but offset therefrom by shoulders 88, 89, respectively. The thickness of the reduced thickness portion 84 is approximately one third the thickness (the width of inner surfaces 74) of the body of the arm 43.

Figure 7:
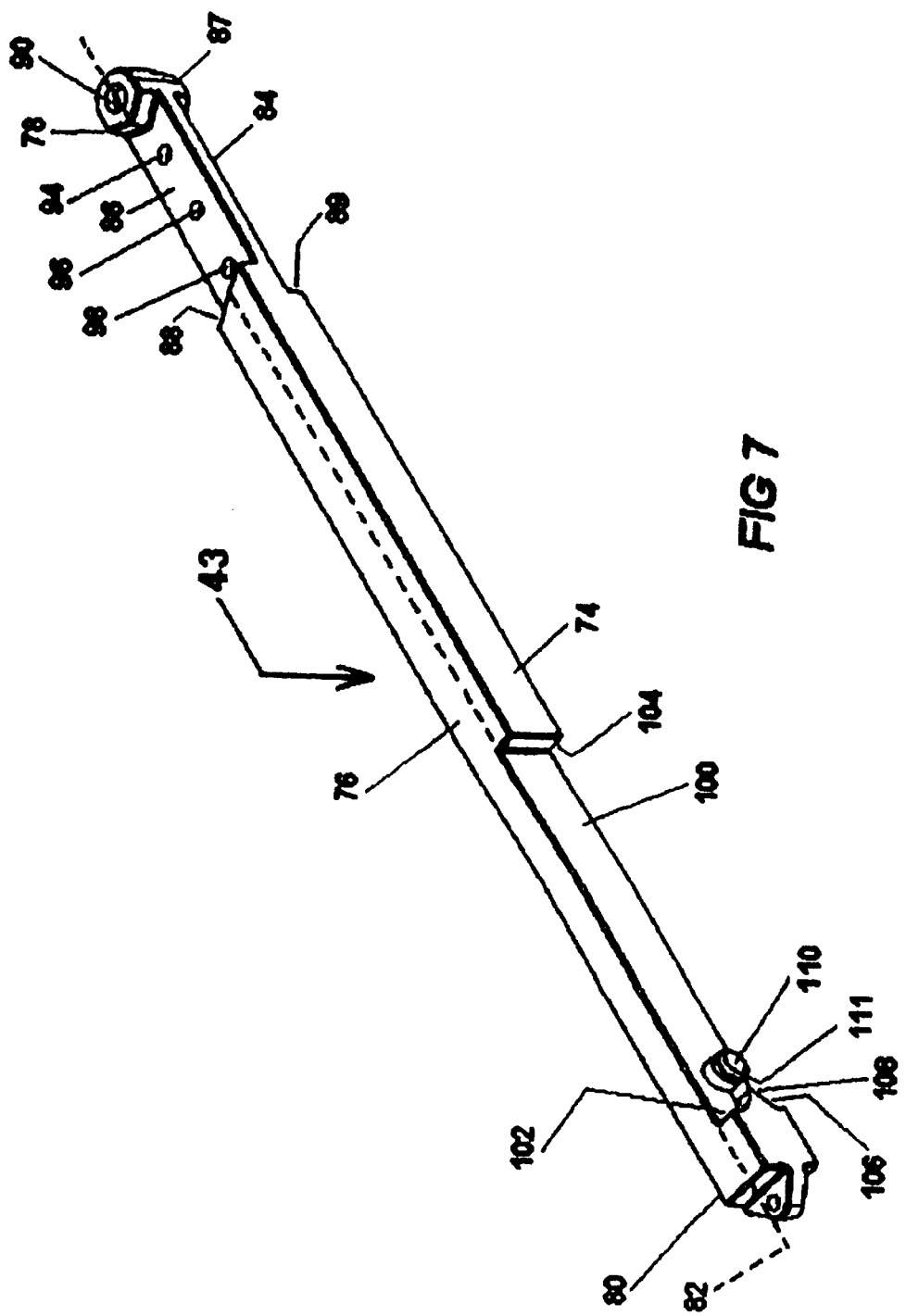
FIG. 7 is an isometric view of the center arm of the retainer depicted in FIG. 3.
Figure 8:
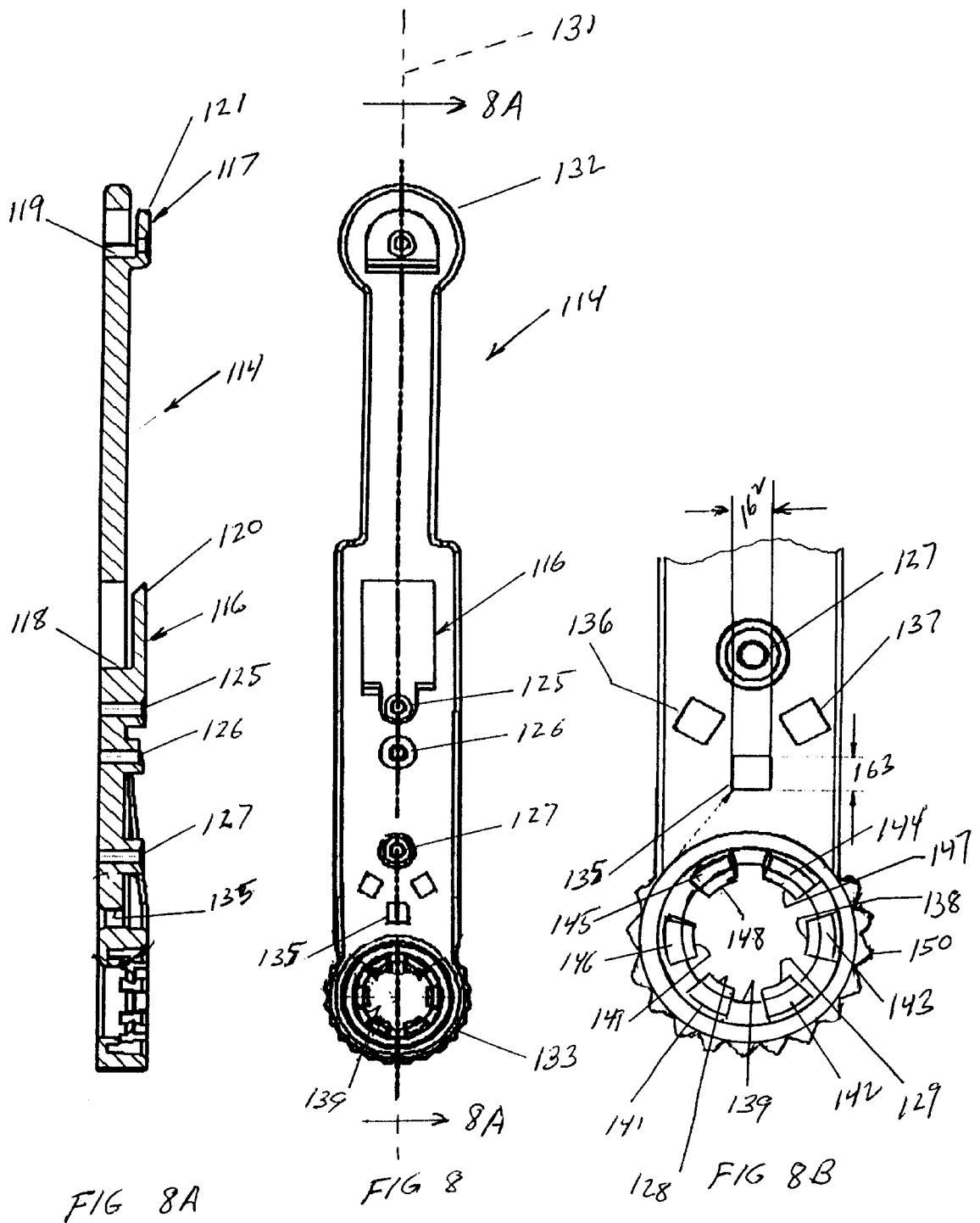
FIG. 8 is a front elevated view of one of the posts attachable to the arms of the retainer shown in FIG. 3.
Figure 9:
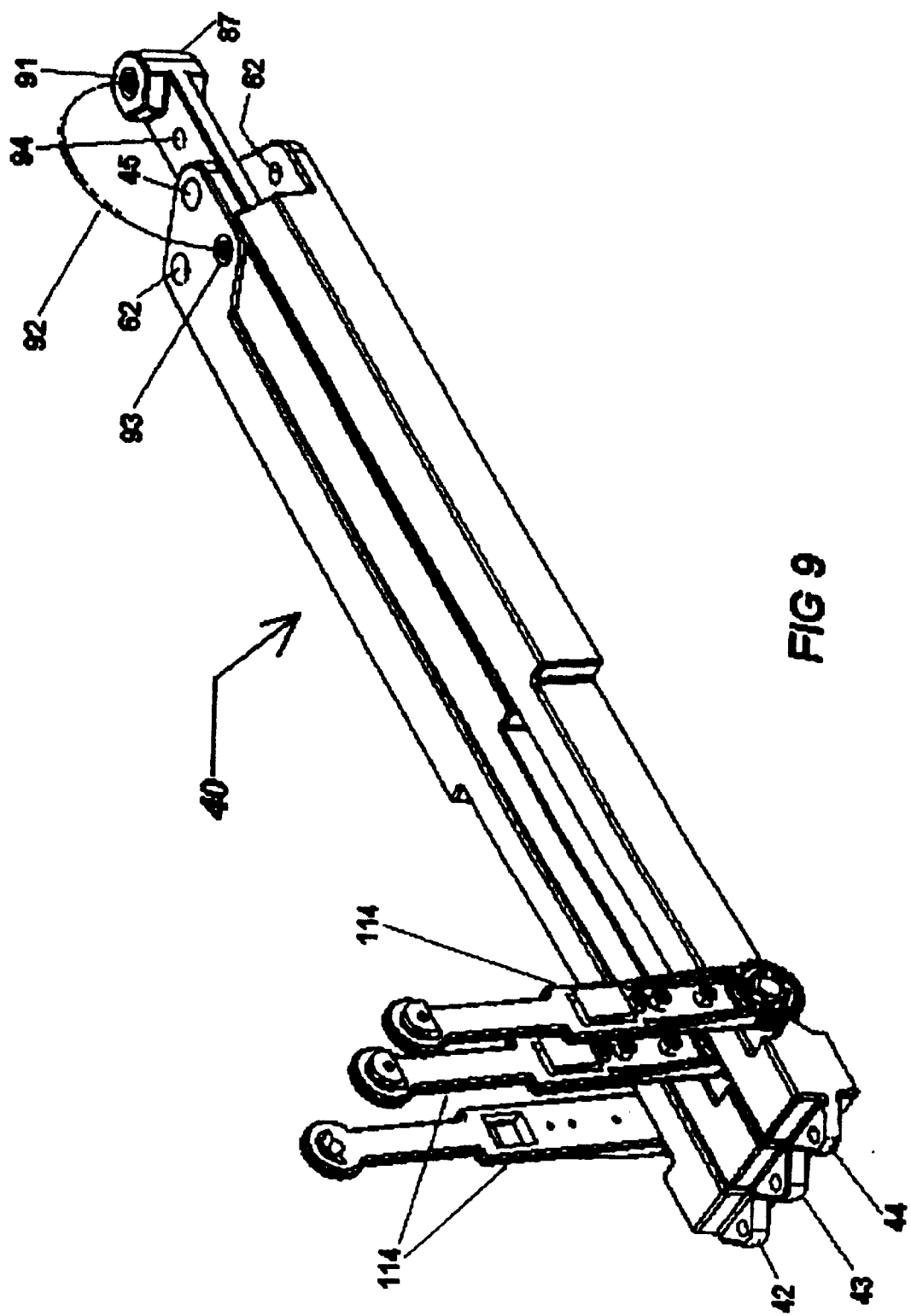
FIG. 9 is isometric view of the retainer shown in FIG. 3 with the arms in the closed orientation and the posts oriented perpendicular to the arms, an orientation useful for storing the retainer while planar decoy are still attached to the posts.

Referring to FIGS. 7, at the pivot end 78 is a retaining block 87 having a transverse hole 90 therein for retaining one end 91 of a flexible cable 92 having a locking pin 93 attached to the other end thereof to be used in locking the position of the arms with respect to one another as is further described below.

Referring further to FIG. 7, positioned axially along the reduced thickness portion 84 of arm 43 are three more transverse parallel holes 94, 96, 98 spaced approximately equally distant from each other with the distance between holes 94 and 96 and the distance between holes 96 and 98 being approximately equal to the thickness of the central body of the arm 14. The spacing between the holes 94 and 96 should be equal to the spacing between holes 62 and 63 of arm 42 and the spacing between the holes 96 and 98 should be equal to the distance between the spacing of holes 63 and 64 of arm 42.

Extending from about midway along the length of the arm 43 to within a short distance of the distal end 80 thereof is a notch 100 in inner surface 74 forming shoulders 102 and 194, the notch 100 and shoulder 102 forming a projection 106 extending perpendicular to the axis 82 of the arm 43 at the distal end 80 thereof. Extending from the projection 106 towards the shoulder 104 is a tooth 108, and spaced a short distance from the tooth 108 is a cylindrical stem 110 having an axis perpendicular to the length of the arm 43 and perpendicular to the axis of the transverse holes 94, 96, 98. The stem 110 has an annular groove 111 around the circumference thereof, the groove positioned about midway along the length thereof.

As best shown in FIGS. 3 to 5, the arms 42, 43, 44 are assembled to each other by sandwiching the reduced thickness portion 84 of the center arm 43 between the mounting pads 58 of the end arms 42, 44. As seen in the drawings, arm 44 in identical to arm 42 except the it has been rotated 180 degrees about its longitudinal axis 48 such that the outer surface 50 of arm 42 is reversed from that of arm 44. The arms 42, 43, 44 are retained in assembled relationship by the pivot pin 45 extending through holes 63, 96, 63 thereof respectively.

In the preferred embodiment, the hole 64 of arm 42, hole 64 of arm 44 and hole 98 of arm 43,are positioned so as to be axially in line with one another for receiving the removable locking pin 93 when the arms 42, 43, 44 are folded together as shown in FIG. 5. Similarly, when the holes 62 of arm 42, hole.94 of arm 43 and hole 62 of arm 44 are axially aligned with one another for receiving the locking pin 93 the arms 42, 43, 44 are angularly spaced at 120 degrees with respect to one another as shown in FIG. 3. Accordingly, when the locking pin 93 is retracted as shown in FIG. 4, the three arms 42, 43, 44 may be rotated about the pivot pin 45 extending through holes 63, 96, 63 from a first position in which the arms are aligned parallel to each other, as shown in FIG. 5, to a second position in which the arms are oriented at 120 degrees from each other as shown in FIG. 3.

When the arms 42, 43,44 are oriented parallel to each other as shown in FIG. 3, a locking pin 93 can be inserted through holes 64, 98 64 to retain the arms in the parallel orientation for storage and when the arms are angularly spaced at an angle of 120 degrees with respect to each other, as shown in FIG. 3, the locking pin 93 can be inserted into holes 62, 94, 62 to retain the arms in the angular orientation. By maintaining the arms 42, 43, 44 in an angular orientation as depicted in the FIG. 3, the device will maintain stability even when planar decoys subject to being blown by wind are mounted to the posts 114.

Referring to FIGS. 3, 4, 5, 8, 8A and 8B, pivotally attached to the distal end of each of the arms 42, 43, 44 is a post 114. Each post 114 has an elongate body with a longitudinal axis 131 extending from an upper end 132 to a lower end 133. Midway along the length of the post 114 is an upwardly extending first retaining clip 116 and at the upper end thereof is a second upwardly extending clip 117. Each of the retaining clips 116, 117 has an outwardly projecting base portion 118, 119 respectively, and upwardly extending hook portion 120, 121 respectively. The retaining clips 116, 117 are adapted to be extended through apertures in the sides of a planar waterfowl decoy, not shown, to retain the decoy to the post 114. A plurality of spaced holes 125, 126, 127 are provided along the axis 131 of post 114 for receiving sheet metal screws for attaching thereto planar decoys that do not have suitable sized rectangular mounting holes for receiving the retaining clips 116, 117.

At the lower end of each post 114 is a transverse mounting hole 139 for rotatably receiving a stem 72, 110 of one of the arms 42–44 as is further described below. Positioned a short distance from the mounting hole 139 and along the axis 131 of the post 114 is a first rectangular shaped locking hole 132 having two sides which are parallel to the axis 131 and two sides which are perpendicular to the axis 131. Positioned on opposite sides of the axis 131 and at a distance from the mounting hole 139 that is greater than the distance to the first locking hole 132 are two other rectangular locking holes 136, 137. Rectangular locking holes 136 and 137 do not have sides parallel and perpendicular to the axis 131 as was the case with the first locking hole 135, instead, the sides are rotated through an angle of about thirty degrees with respect to the axis 131. In the preferred embodiment, the post 114 is injection molded from a structural foam plastic and, as is best shown in FIG. 8B, has a plurality of spring fingers 141, 142, 143, 144, 145, 146 spaced around the circumference of the mounting hole 139. The spring fingers 141–146 define a tubular member, which each spring finger 141–146 having a arcuate inwardly extending rib 128, 129, 138, 147, 148, 149.

To assemble the posts 114 to the distal ends 56, 80 of the arms 42, 43, 44 the stem 72, 110 of each arm is inserted through the mounting hole 139 of one of the posts 84 and the ribs 128, 129, 138, 147, 148, 149 on the fingers 141–146 on the post 114 engage in the annular groove 73, 111 of the stem 72, 110, thereby retaining the post thereon.

Referring furthers to FIGS. 3 to 5 and 8, the lower end of each post 114 defines a generally cylindrical gear, the outer surface of which has a plurality of teeth 130. When the posts 114 are assembled to stems 72, 110 of the arms 42, 43, 44 as described above, the tooth 70 of arm 42 and of arm 44 and the tooth 108 of arm 43 will engage the teeth 150 of the respective post 114 such that the post 114 of each arm 42, 43, 44 is rotatably mounted with the tooth 70, 108 of each arm ratcheting against the teeth 150 of the associated post 114. Each posts 114, therefore, can be manually rotated about the mounting stem 72, 110 to a desired orientation and will be retained in the desired orientation by the engagement of the teeth without requiring the tightening or untightening of a screw or the like.

Figure 13:
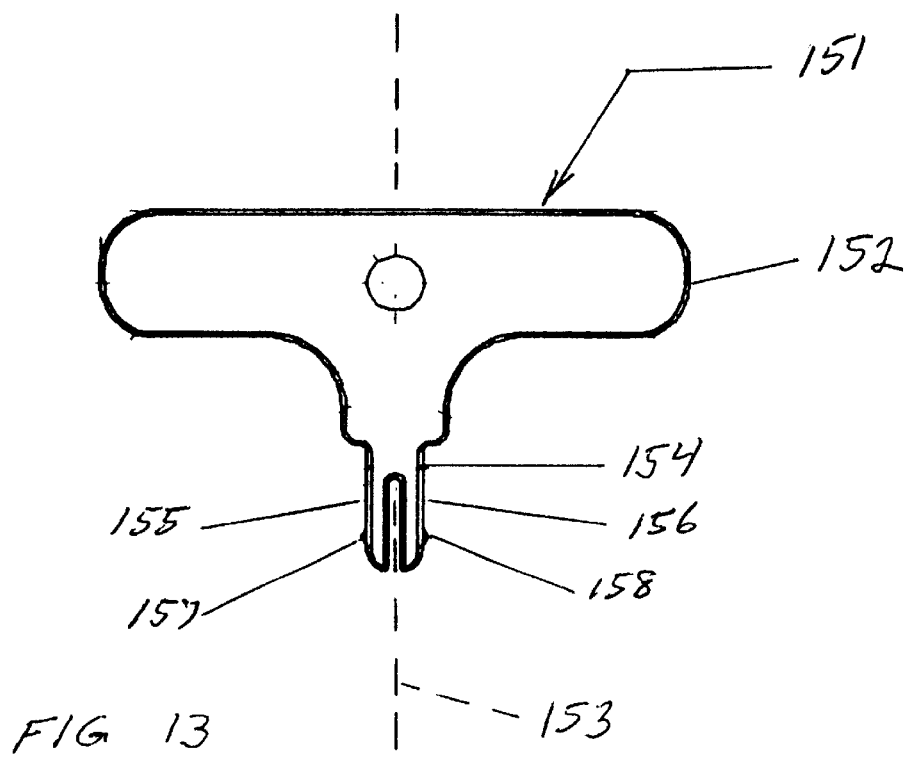
FIG. 13 is a side elevational view of a locking pin for use on the retainer shown in FIG. 3.
Figure 14:
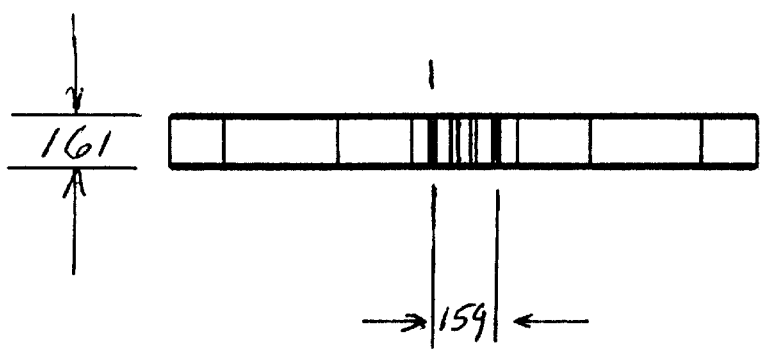
FIG. 14 is an end view of the locking pin shown in FIG. 13.

Referring to FIGS. 3, 13 and 14, although the teeth 150 will generally hold the associated post 14 in the desired angular orientation with respect to the associated arm 42–44, when a decoy, not shown, is attached to the post 114 and the apparatus is set upon open ground to attract fowl, the weight of the attached decoy, the blowing of wind, even the impact of waves lapping against various portions of the device may cause a post 114 to rotate around the stem 72, 110 on which it is mounted, ratcheting the tooth 108 along the teeth 150. To maintain the post 114 in the desired angular orientation with respect to the associated arm 42–44, a locking pin 151 is provided for each post 114. The pin 151 is preferably molded of plastic and has a generally planar butterfly shaped handle 152 symmetric about a longitudinal axis 153. Extending axially from one end of the handle 152 is a connector fork 154 having parallel complementary arms 155, 156 spaced a short distance from each other so that they can flex inwardly. Protrusions 157, 158 are positioned on the outwardly directed opposing sides of arms 155, 156 respectively.

As shown in FIGS. 3, 8, 8A, 8B and 14, the outer dimensions 159, 161 of the fork 154 are approximately equal to the inner dimensions 162, 163 of the locking holes 135, 136, 137 of the posts 114. To retain the post 114 in the desired orientation with respect to the arms 42–44 while the device 10 is being subjected to the elements and is supporting decoys on the posts 114, the connector fork 154 of a locking pin 151 is inserted into one of the locking holes 135, 136, 137 until the protrusions 157, 158 snap out the far side of the holes, thereby retaining the fork 154 of the pin 151 within the hole. The locking hole 135 is positioned on the post 114 so that the wings of the butterfly handle 152 of the pin 151 will rest adjacent the upper surfaces of the associated arm 42–44 thereby retaining the post 114 at a ninety degree angle with respect to the arm 42–44 as shown in FIG. 3. The locking holes 136, 137 are positioned on the post 114 such that when the fork 154 is inserted therein, the post 114 will be locked at an angle with respect to the arm 42–44 that is not perpendicular. For example, the post 114 may form a sixty-degree angle with respect to the associated arm.

The arms 42, 43, 44 are preferable blow molded, and therefor hollow so as to float of the surface of a pond. With the arms 42, 43, 44 thereof retained together by the pivot pin 45, the axes 48, 82, 48 of the arms move within the same plane as was the case with the home made retainer, and is therefor stable in water.

Figure 10:
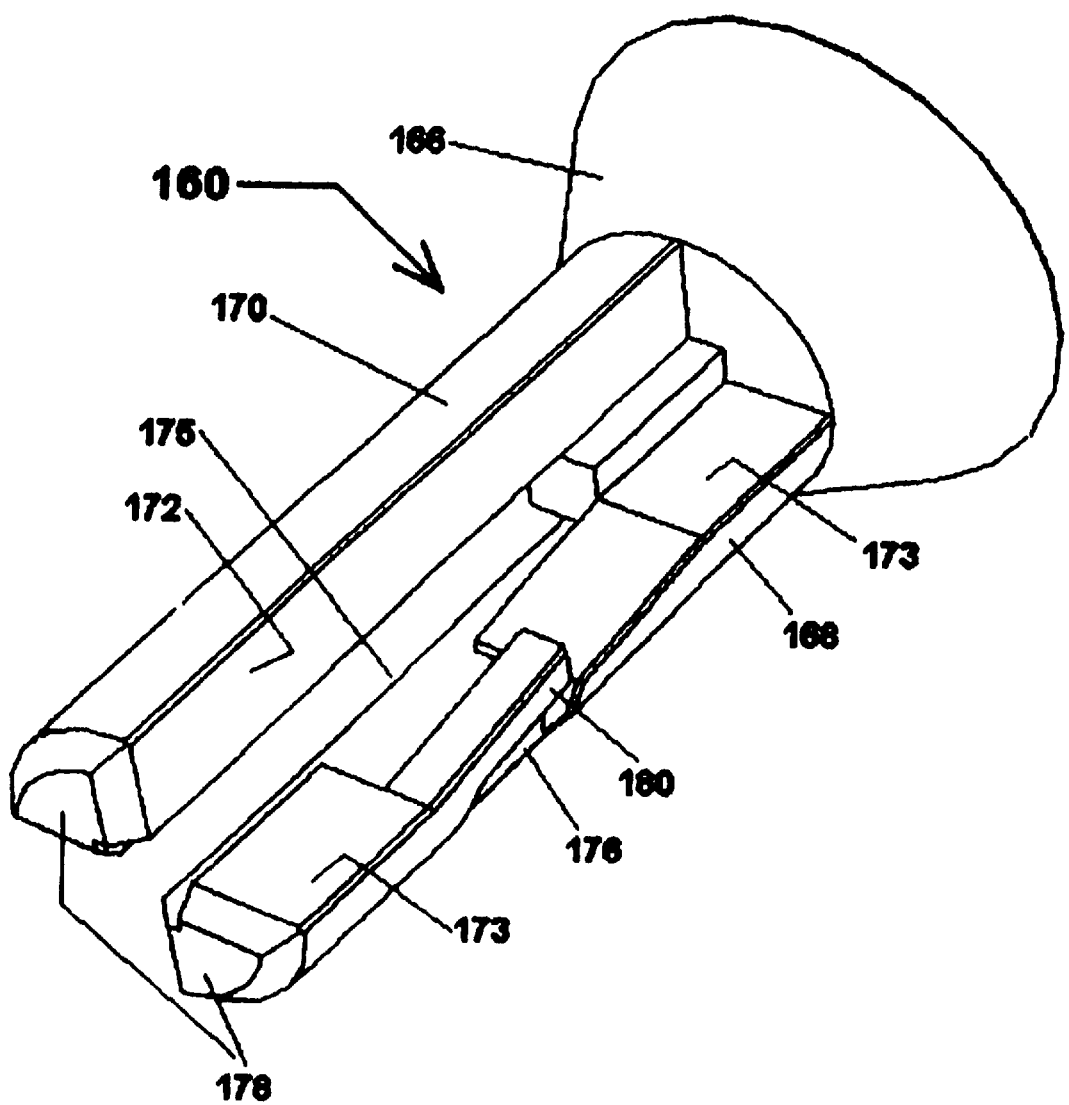
FIG. 10 is a greatly enlarged isometric view of one of the two identical connector parts which, when assembled to each other retains the three arms of the device in pivotal relationship.
Figure 11:
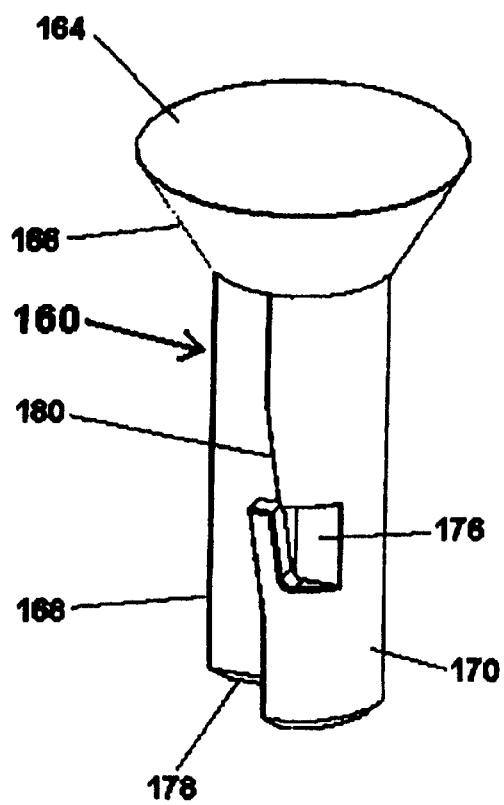
FIG. 11 is an enlarger isometric view of the connector part shown in FIG. 10.
Figure 12:
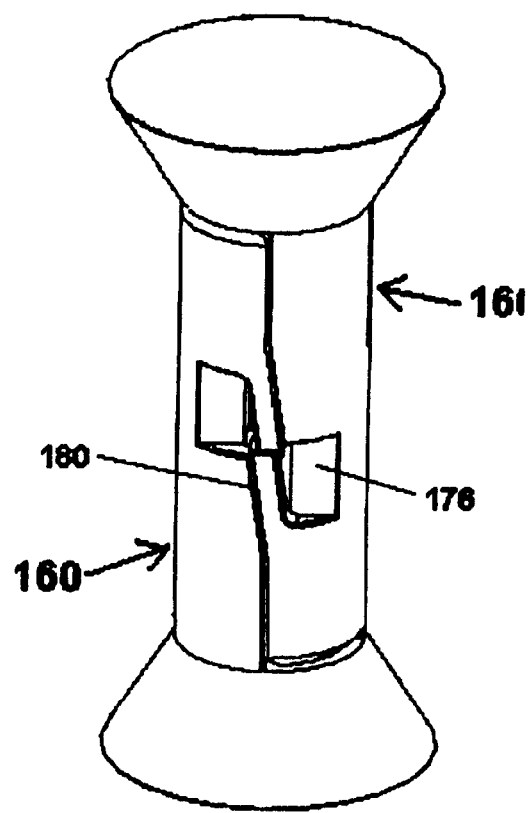
FIG. 12 is a similarly enlarged isometric of the two connector parts, as shown in FIG. 10, in interlocking relationship to each other to form a single connector.

Referring to FIGS. 10, 11 and 12, the pin 45 which extends through the holes 62, 96, 62 is preferably permanently inserted and unremoveable except as the result of the destruction of the parts. In the preferred embodiment, the pin 45 is constructed by the assembly of two elongate identical connector parts 160. Each connector part 160 has an enlarged head having a planar end 164 and a frustoconical wall 166. Extending axially away from the frustoconical wall 166 are a pair of parallel connector bodies 168, 170 each of which has a generally pie shaped configuration with perpendicular planar walls 172, 173, 174, 175. Each central body portion 168, 170 has a cut out portion 176, 177 respectively. The cut out portions 176, 177 extend from a midway point along the connector body 170 away from the frustoconical wall 166 of the head and towards the distal end 178 thereof. An indentation 180, depicted as a ramp, best visible in FIG. 10, slopes towards the cutout portion 176. The ramp 180 has an overall length equal to the length of the cut out portion 176. Each connector body 168, 170 has an elongate finger 182, 184 extending from the end wall 179 of the cut out portion 176 near the distal end 178. Each finger 142, 144 has a length equal to the length of the cut out portion 176 and is configured to angle into the adjacent empty quadrant of space and away from the connector body 168, 170 to which it is attached.

Referring to FIG. 12, when two of the connectors parts 160 are then assembled to each other as shown, the connector bodies 168, 170 of one connector part 160 will move into the vacant quadrant between the connector bodies 168, 170 of the second connector part 160 to a create a solid member. The ends of the fingers 182,184 of each connector body 168, 170 of one connector part 160 will engage the ends of the fingers 182,184 of the opposite connector part 160 body in an end-to-end relationship and thereby prevent the parts from being disassembled. The fingers 182, 184 are spring-loaded to angle outward of their respective bodies 168, 170 and will be received in the While the present invention has been described with respect to a single embodiment, it will be appreciated that many variations and modifications may be made without departing from the true spirit and scope of the invention. It is, therefore, the intent of the appendant claims to cover all such variations and modifications which fall within the true spirit and scope of the invention.

What is claimed:

1. A retainer for holding a plurality of waterfowl decoys comprising
    at least three arms,
    each of said arms having a pivot end, a support end and an elongate body extending from said pivot end to such support end and defining a length,
    pivot means for joining said pivot ends of said arms,
    said pivot means having a single fixed axis about which all of said at least three arms rotate,
    said at least three arms rotatable about said axis about which all of said at least three arms rotate, of said pivot means from a first orientation in which said lengths of said arms are parallel with each other to a second orientation wherein said lengths of said arms are angularly spaced about said axis from one another,
    means for removeably retaining a waterfowl decoy to said support ends of said at least three arms, and
    means for selectively locking and unlocking said arms into one of said first orientations and said second orientations.

2. A retainer for holding a plurality of waterfowl decoys comprising
    at least three arms,
    each of said arms having a pivot end, a support end and an elongate body extending from said pivot end to such support end and defining a length,
    pivot means for joining said pivot ends of said arms,
    said pivot means having an axis,
    said at least three arms moveable about said pivot means from a first orientation in which said lengths of said arms are parallel with each other to a second orientation wherein said lengths of said arms are angularly spaced from one another,
    means for removeably retaining a waterfowl decoy to said support ends of said at least three arms,
    means for selectively locking and unlocking said arms into one of said first orientations and said second orientations, and
    said means for selectively locking comprises a pin insertable into a first set of aligned holes for locking said arms in said first orientation and insertable into a second set of aligned holes for locking said arms in said second orientation.

3. The retainer of claim 2 and further comprising means for selectively locking and unlocking said arms into the other of said first orientation and said second orientation.

4. The retainer of claim 1 wherein said arms are made of blow molded plastic so as to float on water.

5. The retainer of claim 1 wherein one of said means for removeably retaining a waterfowl decoy comprises
    an elongate post having a first end and a second end,
    said first end having a pivot connected to said support end of one of said arms,
    said second end having means for retaining a waterfowl decoy thereon, and
    a locking means for locking said post in at least one orientation with respect to said one of said arms.

6. A retainer for holding a plurality of waterfowl decoys comprising
  at least three arms,
  each of said arms having a pivot end, a support end and an elongate body extending from said pivot end to such support end and defining a length,
  pivot means for joining said pivot ends of said arms,
  said pivot means having a single axis,
  said at least three arms rotatable about said pivot means from a first orientation in which said lengths of said arms are parallel with each other to a second orientation wherein said lengths of said arms are angularly spaced from one another,
  means for selectively locking and unlocking said arms into one of said first orientations and said second orientations,
  means for removeably retaining a waterfowl decoy to said support ends of said at least three arms, including
  an elongate member having a first end and a second end,
  said first end having a pivot connected to said support end of one of said arms,
  said second end having means for retaining a waterfowl decoy thereon,
  said first end of said elongate arm is pivotable about an axis perpendicular to said length of one of said arms, and
  said pivot connection comprises a ratchet.

7. A retainer for holding a plurality of waterfowl decoys comprising
  at least three arms,
  each of said arms having a central longitudinal axis, a pivot end, a support end and an elongate body extending from said pivot end to such support end,
  pivot means for joining said pivot ends of said arms,
  said pivot means having a single axis about which all of said at least three arms rotate,
  said at least three arms rotatable about said axis from a first orientation in which said longitudinal axes of said arms are parallel with each other to a second orientation wherein said longitudinal axes of said arms are angularly spaced from one another about said axis,
  means for maintaining said longitudinal axes of all of said at least three arms for movement in the same plane as said at least three arms move from said first orientation to said second orientation, and
  means for removably retaining a waterfowl decoy to said support ends of said at least three arms.

8. The retainer of claim 7 and further comprising means for selectively locking and unlocking said arms into one of said first orientation and said second orientation.

9. A retainer for holding a plurality of waterfowl decoys comprising
  at least three arms,
  each of said arms having a central longitudinal axis, a pivot end, a support end and an elongate body extending from said pivot end to such support end,
  pivot means for joining said pivot ends of said arms,
  said pivot means having a single axis about which all of said at least three arms rotate,
  said at least three arms moveable about said axis from a first orientation in which said longitudinal axes of said arms are parallel with each other to a second orientation wherein said longitudinal axes of said arms are angularly spaced from one another,
  means for maintaining said longitudinal axes of all of said at least three arms for movement in the same plane as said at least three arms move from said first orientation to said second orientation,
  means for selectively locking and unlocking said arms into one of said first orientation and said second orientation,
  said means for selectively locking comprises a pin insertable into a first set of aligned holes for locking said arms in said first orientation and insertable into a second set of aligned holes for locking said arms in said second orientation, and
  means for removeably retaining a waterfowl decoy to said support ends of said at least three arms.

10. The retainer of claim 7 wherein said arms are made of blow molded plastic so as to float on water.

11. The retainer of claim 9 wherein one of said means for removeably retaining a waterfowl decoy comprises
  an elongate member having a first end and a second end,
  said first end having a pivot connected to said support end of one of said arms, and
  said second end having means for retaining a waterfowl decoy thereon.

12. The retainer of claim 11 wherein
  said first end of said elongate member is pivotable about an axis perpendicular to said length of one of said arms, and
  said pivot connection comprises a ratchet.

13. A retainer for holding a plurality of waterfowl decoys comprising
  at least three arms,
  each of said arms having a central longitudinal axis, a pivot end, a support end and an elongate body extending from said pivot end to such support end,
  pivot means for joining said pivot ends of said arms,
  said pivot means having a single axis about which all of said at least three arms rotate,
  said at least three arms moveable about said axis from a first orientation in which said longitudinal axes of said arms are parallel with each other to a second orientation wherein said longitudinal axes of said arms are angularly spaced from one another,
  means for maintaining said longitudinal axes of all of said at least three arms for movement in the same plane as said at least three arms move from said first orientation to said second orientation,
  said at least three arms include a pair of outer arms and at least one inner arm as viewed while said at least three arms are in said first orientation,
  each of said outer arms having a pad at said pivot end thereof, and
  said pivot means including a pin extending through said pads, and
  means for removeably retaining a waterfowl decoy to said support ends of said at least three arms.

14. The retainer of claim 13 wherein said pair of outer arms are identical to each other.

15. A non-removable pin for retaining parts in assembled relationship comprising
  a first pin portion and a second pin portion,
  said first pin portion having a head and an elongate body portion,
  said elongate body portion having an outer end, an elongate finger having an outer end moveable with respect to said elongate body portion, said elongate finger mounted against said outer end of said elongate body portion and said outer end of said finger extending towards said head, and said elongate body portion having a ramp wall between said outer end of said finger and said head.

16. A non-removable pin in accordance with claim 15 wherein said second pin portion is identical to said first pin portion and wherein said elongate body portions of said first and said second pin portion assemble together to form a generally cylindrical body with said outer end of each of said fingers against said ramp wall of the other of said first and second pin portions and said fingers of both of said pin portions in contact with each other to maintain the two pin portions in assembled relationship.

17. A retainer for holding a plurality of waterfowl decoys comprising at least three arms, each if said arms having a pivot end, a support end and an elongate body extending form said pivot end to such support end and defining a length, means for pivotally joining said pivot ends of said arms, said at least three arms moveable from a first orientation in which said lengths of said arms are parallel with each other to a second orientation wherein said lengths of said arms are angularly spaced from one another, an elongate post having a first end and a second end, said first end of said post having a pivot connected to said support end of one of said arms, said second end having means for retaining a waterfowl decoy thereon, and manually operable locking means between said post and said at least one arm for selectively locking and unlocking said post in at least one orientation with respect to said one of said arms.

18. A retainer in accordance with claim 17 wherein said locking means includes a hole in said post and a pin removeably insertable in said hole for locking said post in said at least one orientation while said pin is inserted in said hole and for unlocking said post when said pin is removed from said hole.

19. A retainer in accordance with claim 18 wherein said pin has a handle with a surface that rest on a surface of said one of said arms to lock said post in said at least one orientation.

20. a non-removable pin for retaining parts in assembled relationship comprising a first pin portion and a second pin portion, said first pin portion having a head and an elongate body portion, said elongate body portion having an outer end, an elongate finger on said first pin portion, said elongate finger having an outer end moveable with respect to said elongate body portion, said elongate finger mounted against said outer end of said elongate body portion and said outer end of said finger extending towards said head, said second pin portion having a second head and a second elongate body portion, said second elongate body portion having an outer end, a second elongate finger on said second pin portion, said second elongate finger having an outer end moveable with respect to said second elongate body portion, said second elongate finger mounted against said outer end of said second elongate body portion and said outer end of said second finger extending towards said second head, and said outer end of said finger in contact with said outer end of said second finger to prevent separation of said first pin portion from said second pin portion.

* * * * *

UNITED STATES PATENT AND TRADEMARK OFFICE
CERTIFICATE OF CORRECTION

PATENT NO. : 6,655,071 B2
DATED : December 2, 2003
INVENTOR(S) : Charles David Barnes et al.

It is certified that error appears in the above-identified patent and that said Letters Patent is hereby corrected as shown below:

Column 1,
Line 59, after "stability" delete ". In" and substitute -- in --.

Column 2,
Line 37, after "aligned a" delete "licking" and substitute -- locking --.

Column 7,
Line 66, at the end of theline, insert a period --. --. Then delete Line 67 of column 7, consisting of the words "and will be received in the".

Column 8, (in the beginning of the column)
Line 19, after "axis", delete the words "about which all of said at least three arms rotate", the deletions ending on line 20.

Column 9,
Line 8, after "signal axis" insert -- about which all of said at least three arms rotate --.

Signed and Sealed this

Seventeenth Day of August, 2004

JON W. DUDAS
*Acting Director of the United States Patent and Trademark Office*